United States Patent [19]

Shimpuku et al.

[11] Patent Number: 5,537,422

[45] Date of Patent: Jul. 16, 1996

[54] SYNCHRONIZATION SIGNAL DETECTOR, SYNCHRONIZATION SIGNAL DETECTING METHOD AND DEMODULATOR

[75] Inventors: Yoshihide Shimpuku, Kanagawa; Hiroyuki Ino; Yasuyuki Chaki, both of Chiba; Toshiyuki Nakagawa, Kanagawa, all of Japan

[73] Assignee: Sony Corporation, Tokyo, Japan

[21] Appl. No.: 565,620

[22] Filed: Nov. 22, 1995

Related U.S. Application Data

[63] Continuation of Ser. No. 85,612, Jun. 30, 1993, abandoned.

[30] Foreign Application Priority Data

Jun. 30, 1992 [JP] Japan .................................. 4-194577

[51] Int. Cl.⁶ .......................... H03M 13/00; H03M 7/40
[52] U.S. Cl. ............................ 371/42; 341/59; 375/366
[58] Field of Search ............................ 371/42; 341/59; 375/366

[56] References Cited

U.S. PATENT DOCUMENTS

| | | | |
|---|---|---|---|
| 3,689,899 | 9/1972 | Franaszek | 340/172.5 |
| 4,348,659 | 9/1982 | Fujimori et al. | 340/347 |
| 4,914,438 | 4/1990 | Kameyama | 341/59 |
| 4,985,700 | 1/1991 | Mikami | 341/59 |
| 5,034,742 | 7/1991 | Bond et al. | 341/67 |
| 5,062,011 | 10/1991 | Hase et al. | 360/40 |
| 5,138,314 | 8/1992 | Shimpuku et al. | 341/58 |
| 5,138,316 | 8/1992 | Konishi | 341/67 |
| 5,173,694 | 12/1992 | Lynch, Jr. et al. | 341/59 |
| 5,264,847 | 11/1993 | Bhandari | 341/81 |
| 5,365,231 | 11/1994 | Niimura | 341/58 |
| 5,388,993 | 2/1995 | McKiel et al. | 434/118 |
| 5,400,023 | 3/1995 | Ino et al. | 341/59 |

FOREIGN PATENT DOCUMENTS

| | | | |
|---|---|---|---|
| 0314512A2 | 5/1989 | European Pat. Off. | G11B 20/14 |
| 0329533A1 | 8/1989 | European Pat. Off. | H03M 7/40 |
| 0442548A1 | 8/1991 | European Pat. Off. | H03M 7/40 |
| 455267 | 11/1991 | European Pat. Off. . | |
| 0455267A3 | 11/1991 | European Pat. Off. . | |
| 0467678A2 | 1/1992 | European Pat. Off. | H03M 7/42 |
| 0560339A1 | 9/1993 | European Pat. Off. | H03M 7/40 |
| 0577402A2 | 1/1994 | European Pat. Off. | G11B 20/10 |
| 3602808A1 | 8/1987 | Germany | H03M 7/40 |
| 61-225920 | 10/1986 | Japan . | |

OTHER PUBLICATIONS

Patent Abstracts Of Japan, vol. 11, No. 70 (E–485) (2517), 3 Mar. 1987 & JP-A-61 225 920 (Toshiba) 7 Oct. 1986.

*Primary Examiner*—Stephen M. Baker
*Attorney, Agent, or Firm*—Limbach & Limbach; Philip M. Shaw, Jr.

[57] ABSTRACT

A synchronization detector includes a NRZI circuit for extracting edge portions of RF signals detected as binary-valued signals to form a pulse train, a counter for counting the number of channel clocks in the distance between transitions represented by the edge portions, a latch circuit operated responsive to pulses from the NRZI circuit for holding a number of previously counted channel clocks immediately preceding a current count of channel clocks, and AND gates and an OR gate for detecting synchronization signals when the combination of the channel clocks from the counter and the latch circuit is the combination of the maximum distance between transitions Tmax and Tmax–kT (k=1 or 2) of a (d, k; m, n; r) modulation code. Synchronization signals may be detected promptly, even if the frame structure is increased in size to enable restoration of synchronization to be expedited when frame structure synchronization is not in order. A demodulator utilizing the synchronization signal detector is also disclosed.

14 Claims, 9 Drawing Sheets

DATA ...01000 00000 00000 01000 00000 00000 00001 00000 00000 00001 00000 ...
    <0111>  <11·11>     <0111>     <11·11>     <0100>     <11·11>     <0100>
         20T         23T         20T         23T         20T

FIG.4

DATA ....01000 <0111> 00000 00000 <11·11> 00000 01000 <0111> 00000 00000 <11·11> 00000 00010 <0101> 00000 00000 <11·11> 00000 00001 <0100> 00000.....

NRZ DATA · · · 0 1 1 1 1 1 1 1 0 0 0 0 0 0 0 0 0 1 1 1 · · ·

NRZI DATA · · · 0 1 0 0 0 0 0 0 1 0 0 0 0 0 0 0 0 1 0 0 · · ·

FIG.6

NRZ DATA

5T                              23T                                     17T
00000 11111 11111 11111 11111 11100 00000 00000 00000 11 · · ·

NRZI DATA 10000 10000 00000 00000 00000 00010 00000 00000 00000 10 · · ·

FIG.7

NRZI DATA · · · 0 1 0 0 0 0 0 0 1 0 0 0 0 0 0 0 0 1 0 0 · · ·

COUNT · · · · 0 1 2 3 4 5 6 0 1 2 3 4 5 6 7 8 0 1 2 · · ·

LATCH · · · · · · · · · · 6 6 6 6 6 6 6 6 8 8 · · ·

FIG.8

NRZI DATA

|  |  |  |  |  |
|---|---|---|---|---|
| NRZI DATA | 10000 10000 00000 | 0 0 0 1 0 00000 | 0 0 0 0 1 00000 10000 10 . . |
| COUNT | 01234 01234 56789 | 20212201 23456 | 17181920 0 12345 01234 01 . . |
| LATCH | . . . . . . . . 44444 44444 | 44422 22......22 | 2222222220 20.....20 55555 44 . . | ta →    tb →

SYNCHRONIZATION SIGNAL DETECTOR, SYNCHRONIZATION SIGNAL DETECTING METHOD AND DEMODULATOR

This is a continuation of application Ser. No. 08/085,612 filed on Jun. 30, 1993, abandoned.

BACKGROUND OF THE INVENTION

1. Field of the Invention

This invention relates to a synchronization signal detector for detecting synchronization signals (or frame synchronization signals) recorded on a recording medium, a method for detecting the synchronization signals, and a demodulator for demodulating data stored on a recording medium.

2. Description of the Related Art

For a disc recording system for a so-called compact disc (CD), as one of the disc-shaped recording media, such as an optical disc, magnetic disc or a magneto-optical disc, an eight-to-fourteen modulation (EFM) system is employed. With this modulation system, data are processed on the basis of 8 bits as a unit, and the 8-bit bit string is translated into a string of 14-channel bits.

Figure 12:
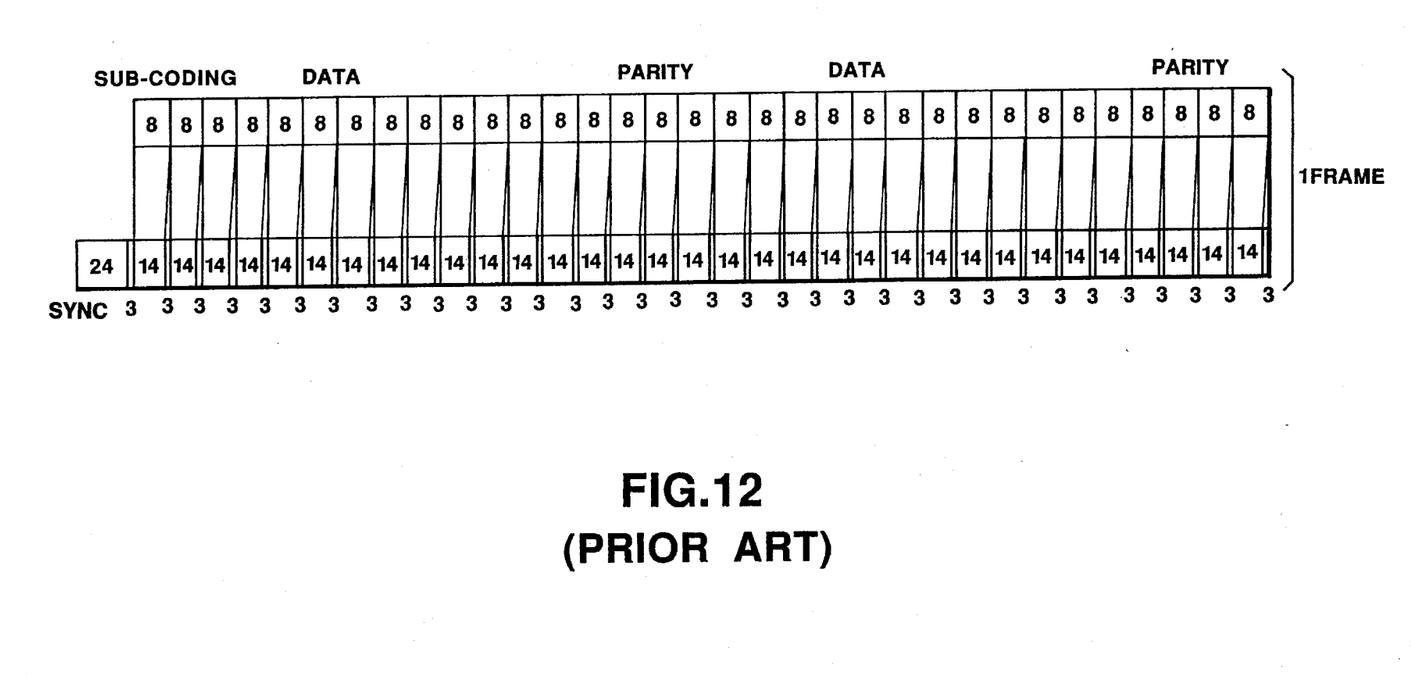
FIG. 12 illustrates a CD recording format.

The recording format for a CD is shown in FIG. 12 and in Table 1, in which 24 channel bit synchronization signals (frame synchronization signals), 14 channel bit sub-coding data, 336 (24×14) channel bit data and 112 (8×14) channel bit parity data are furnished. In addition, 3 bits each are furnished as margin bits for connecting the pattern data, thus totalling 102 channel bits. Meanwhile, as one of the roles of the margin bits, the maximum distance between transition of magnetization Tmax=11 T is adjusted for not being repeated twice for the synchronization signals. The encoding efficiency and the redundancy of the present recording format are 57.1% and 42.9%, respectively.

TABLE 1

|  | data | channel bit |
| --- | --- | --- |
| sync signals | — | 24 |
| subcoding | 8 | 14 |
| data | 192 | 336 |
| parity | 64 | 112 |
| margin bits | — | 102 |
| total | 264 | 588 |

The above-mentioned CD recording format is disadvantageous in that there is only one synchronization signal, margin bits are required for connecting the synchronization signals, and an exceptional bit string is set aside for the synchronization signals.

Meanwhile, each frame of the recording format for CD is composed of 588 channel bits, as shown above. If it is assumed that moving picture data is to be recorded on the CD-size disc, and the recording format is pursuant to the CD recording format and has a frame length longer than that provided in the CD recording format, the distance between the synchronization signals in the frame structure is increased, so that, if the frame structure synchronization is not in order, data restoration tends to be delayed.

OBJECT AND SUMMARY OF THE INVENTION

In view of the above-described status of the art, it is an object of the present invention to provide a synchronization signal detector, a method for detecting synchronization signals and a demodulator relevant to the synchronization signal detector.

In accordance with the present invention, there is provided a synchronization signal detector comprising means for extracting edges of RF signals detected as binary-valued signals, means for counting the number of channel clocks produced during a distance between adjacent transitions defined by extracted edges, means for holding the count of the channel clocks generated during a distance between the transitions directly preceding the distance between the transitions for which the number of pulses is currently counted, and means for detecting synchronization signals from outputs of the counting means and said holding means, using two patterns as synchronization signals, one of which is a frame synchronization signal and the other of which is a synchronization signal for at least error correction data.

In accordance with the present invention, there is also provided a demodulating device for demodulating a variable length code comprising a synchronization signal detector section having means for extracting edges of RF signals detected as binary-valued signals, means for counting the number of channel clocks produced during a distance between adjacent transitions defined by extracted edges, means for holding the count of the channel clocks generated during a distance between the transitions directly preceding the distance between the transitions for which the number of pulses is currently counted, and means for detecting synchronization signals from outputs of the counting means and the holding means, using two patterns as synchronization signals, one of which is a frame synchronization signal and the other of which is a synchronization signal for at least error correction data. The apparatus also comprises a timing controlling section for detecting the block boundary of said variable length code data based on detected synchronization signals, a data demodulating section for demodulating N-bit based variable length code data into M-bit based original data in accordance with a demodulation table performing an inverse conversion to the conversion prescribed by the modulation table used for encoding, based on the detected variable code length data and output data of the timing control section, and a matching section supplied with the demodulated original data and an output of the timing control section as inputs for matching the original data to an external circuit.

The foregoing and other objectives, features and advantages of the invention will be more readily understood upon consideration of the following detailed description of certain preferred embodiments of the invention, taken in conjunction with the accompanying drawings.

DESCRIPTION OF THE PREFERRED EMBODIMENTS

Referring to the drawings, preferred embodiments of the synchronization detector, method for detecting synchronization signals and the decoder relevant to the synchronization detector are explained in detail.

Figure 1:
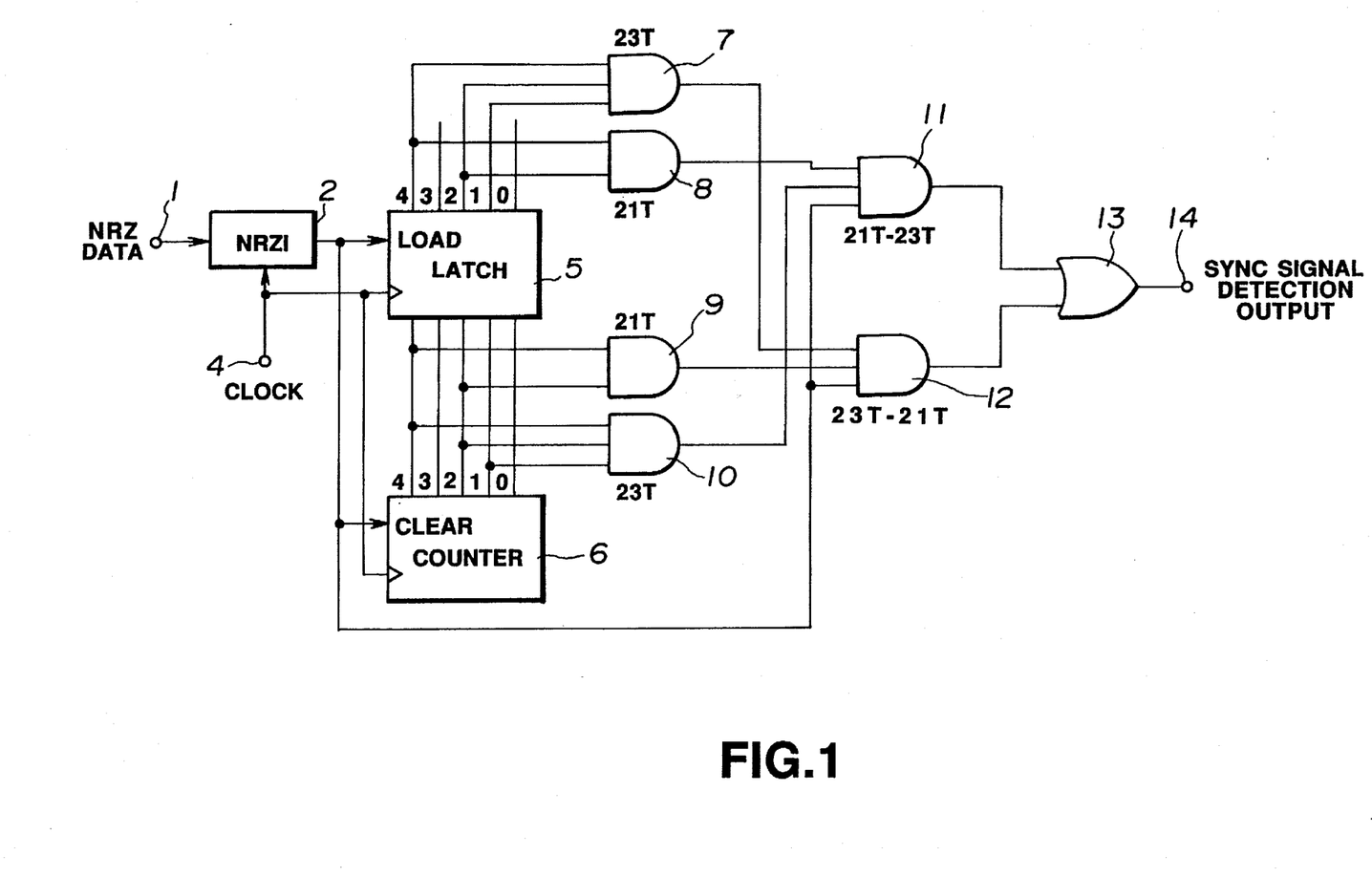
FIG. 1 is a schematic block circuit diagram showing a synchronization signal detector according to the present invention.

Referring to FIG. 1, the synchronization detector of the present embodiment includes a non-return-to-zero inverted (NRZI) circuit 2, as edge detection means, for extracting edges of detected binary-valued RF signals to generate a pulse train, a counter 6 for counting the number of channel clocks T of the distance between transitions which is the distance between the edges extracted from the NRZI circuit 2, that is the number of channel clocks T applied via terminal 4, a latch circuit 5 operated responsive to the pulses from the NRZI circuit 2 to hold the number of channel clocks corresponding to the distance between transitions directly preceding the distance between transitions being counted by counter 6, and AND gates 7 to 12 and an OR gate 13 for detecting synchronization signals from an output of the counter 6 and/or latch circuit 5 using two different patterns as synchronization signals for error correction, with one of the patterns being used as a frame synchronization signal and the other pattern as the synchronization signal for error correction data.

The modulation coding employed in the present invention is a variable length coding (d, k; m, n; r) having different code word lengths depending on input data word lengths. Before proceeding to the description of the arrangement shown in FIG. 1, the variable length coding is explained.

The variable length coding is expressed as (d, k; m, n; r) in which d, k means a constraint imposed on a train of the same bits, d means the minimum length of a train of "0" bits, k means the maximum length of the train of "0" bits, m means the basic data length, n means the basic code length, n/m means a conversion ratio and r means the basic data length of conversion (constraint length). For example, the so-called 2-7RLL employed in a hard disc is expressed as (2, 7; 1, 2; 4) code.

In the present embodiment, (4, 22; 2, 5; 5) code is employed as the (d, k; m, n; r) code.

The data and the conversion table with the (4, 22; 2, 5; 5) code is shown in Table 2.

TABLE 2

| | data | translation code |
|---|---|---|
| r = 1 | 11 | 00000 |
| | 10 | 10000 |
| | 111111 | 000010000100000 |
| r = 2 | 0111 | 0100000000 |
| | 0110 | 0010000000 |

TABLE 2-continued

| | data | translation code |
|---|---|---|
| | 0101 | 0001000000 |
| | 0100 | 0000100000 |
| r = 3 | 001111 | 010000100000000 |
| | 001110 | 010000010000000 |
| | 001101 | 010000001000000 |
| | 001100 | 010000000100000 |
| | 001011 | 000100000100000 |
| | 001010 | 001000010000000 |
| | 001001 | 001000001000000 |
| | 001000 | 001000000100000 |
| | 000111 | 000100001000000 |
| r = 4 | 00011011 | 01000010000100000000 |
| | 00011010 | 01000010000010000000 |
| | 00011001 | 01000010000001000000 |
| | 00011000 | 01000010000000100000 |
| | 00010111 | 01000000100000100000 |
| | 00010110 | 01000001000010000000 |
| | 00010101 | 01000001000001000000 |
| | 00010100 | 01000001000000100000 |
| | 00010011 | 01000000100001000000 |
| | 00010010 | 00100001000010000000 |
| | 00010001 | 00100001000001000000 |
| | 00010000 | 00100001000000100000 |
| | 00001111 | 00010000010000100000 |
| | 00001110 | 00100000010000100000 |
| | 00001101 | 00100000100001000000 |
| | 00001100 | 00100000100000100000 |
| | 00001011 | 01000000010000100000 |
| | 00001010 | 00001000010000100000 |
| | 00001001 | 00010000100001000000 |
| | 00001000 | 00010000100000100000 |
| r = 5 | 0000011111 | 0100001000010000100000000 |
| | 0000011110 | 0100001000010000010000000 |
| | 0000011101 | 0100001000010000001000000 |
| | 0000011100 | 0100001000010000000100000 |
| | 0000011011 | 0100001000000100000100000 |
| | 0000011010 | 0100001000001000010000000 |
| | 0000011001 | 0100001000001000001000000 |
| | 0000011000 | 0100001000001000000100000 |
| | 0000010111 | 0100001000000100001000000 |
| | 0000010110 | 0100001000010001000000000 |
| | 0000010101 | 0100001000010001000000000 |
| | 0000010100 | 0100001000010000000100000 |
| | 0000010011 | 0100000010000100000100000 |
| | 0000010010 | 0100000100000100001000000 |
| | 0000010001 | 0100000100000100001000000 |
| | 0000010000 | 0100000100000100000100000 |
| | 0000001111 | 0100001000000010000100000 |
| | 0000001110 | 0100000001000010000100000 |
| | 0000001101 | 0100000010000100001000000 |
| | 0000001100 | 0100000010000100000100000 |
| | 0000001011 | 0010000100000100001000000 |
| | 0000001010 | 0010000100001000010000000 |
| | 0000001001 | 0010000100001000001000000 |
| | 0000001000 | 0010000100001000000100000 |
| | 0000000111 | 0010000100000100000100000 |
| | 0000000110 | 0010000100000010000100000 |
| | 0000000101 | 0010000100001000001000000 |
| | 0000000100 | 0010000100001000000100000 |
| | 0000000011 | 0010000001000010000100000 |
| | 0000000010 | 0001000010000010000100000 |
| | 0000000001 | 0001000010000100001000000 |
| | 0000000000 | 0001000010000100000100000 |
| | | 0001000010000100000100000 |
| | | 0000100001000010000100000 |

Figure 2:
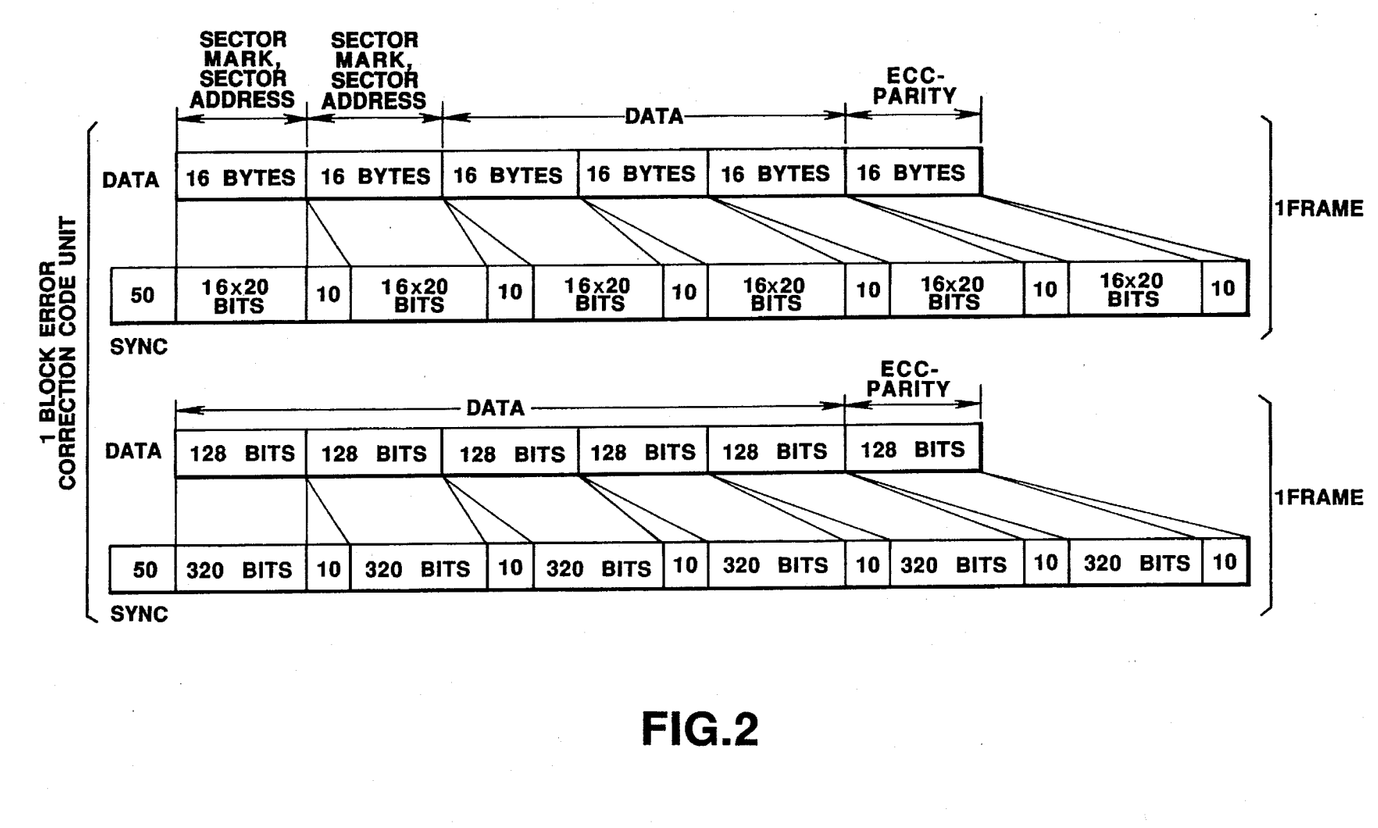
FIG. 2 illustrates a frame structure and the unit of an error correction coding according to the present invention.
Figure 3:
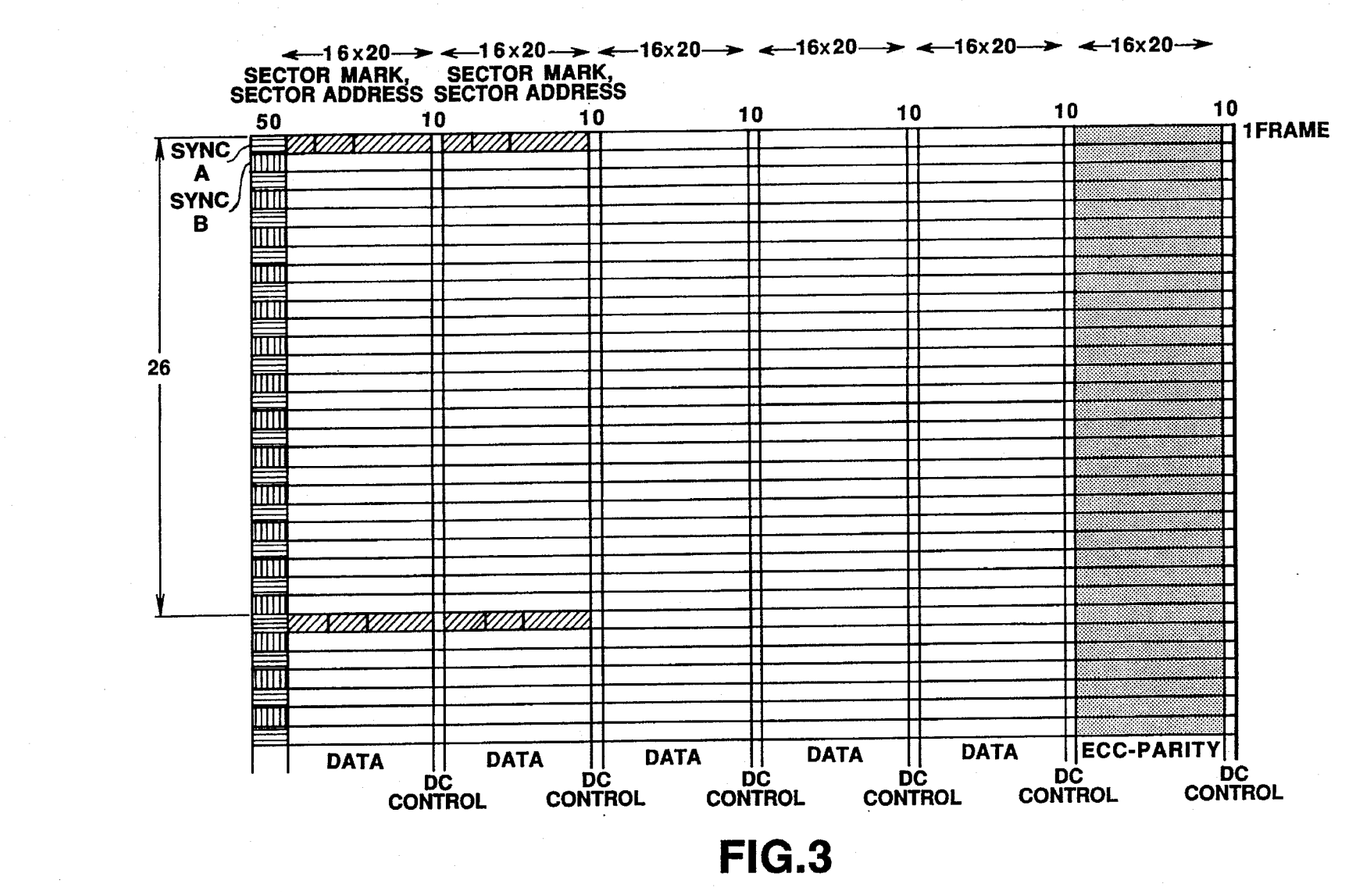
FIG. 3 illustrates an entire recording format according to the present invention.

In the present embodiment described herein, a recording format having a frame structure which becomes larger than the frame of the above-described EFM recording format for CD is taken as an example. The recording format of the present embodiment employs a block consisting of two frames as a unit for error correction codes, as shown in FIG. 2. Table 4 shows an arrangement of a sector (=26 frames) and FIG. 3 shows an overall format.

TABLE 3

|  | data | channel bit |
|---|---|---|
| sync signals | — | 100 |
| sector mark/sector address | 256 | 640 |
| data | 1024 | 2560 |
| parity | 256 | 640 |
| DC control | — | 120 |

TABLE 4

|  | data | channel bit |
|---|---|---|
| sync signals | — | 1300 |
| sector mark/sector address | 256 | 640 |
| data | 16384 | 40960 |
| parity | 3328 | 8320 |
| DC control | — | 1560 |
| total | 19968 | 52780 |

Referring to Table 3 and FIG. 2, the recording format of the present embodiment includes, in the first two frames, 100 channel bit synchronization signals, 640 channel bit sector mark addresses, 2560 channel bit data and 640 channel bit parity data. Also, there are furnished a sum total of 120 channel bits between the patterns as DC control data. Each sector includes 1300 channel bit synchronization signals, 640 channel bit sector mark sector addresses, 40960 channel bit data, 8320 channel bit parity data and 160 channel bit DC control data. The coding efficiency and redundancy of the present format are 7.6% and 22.4%, respectively.

According to Table 2, it can be seen that consecutive data strings translate to channel bits. These channel bits, under this code, are sets of contiguous "0" channel bits separated by a single "1" channel bit, where each "1" channel bit represents a transition of magnetization. By placing various data strings together, it can be seen that there is a maximum distance between transitions of magnetization (Tmax) and a minimum distance between transitions of magnetization (Tmin). Under modulation by the above-mentioned (4, 22; 2, 5; 5) code, Tmax=23 and Tmin=5.

For the synchronization signal (frame synchronization pattern) to use in the case of modulation by the above-mentioned (d, k; m, n; r) code, it is necessary to select a pattern in which the maximum distance between transitions of magnetization Tmax is not increased, and the minimum distance between transitions of magnetization Tmin is not excessively decreased. Also, the pattern should not appear in the modulated data and preferably the pattern has a minimum length.

Figure 4:
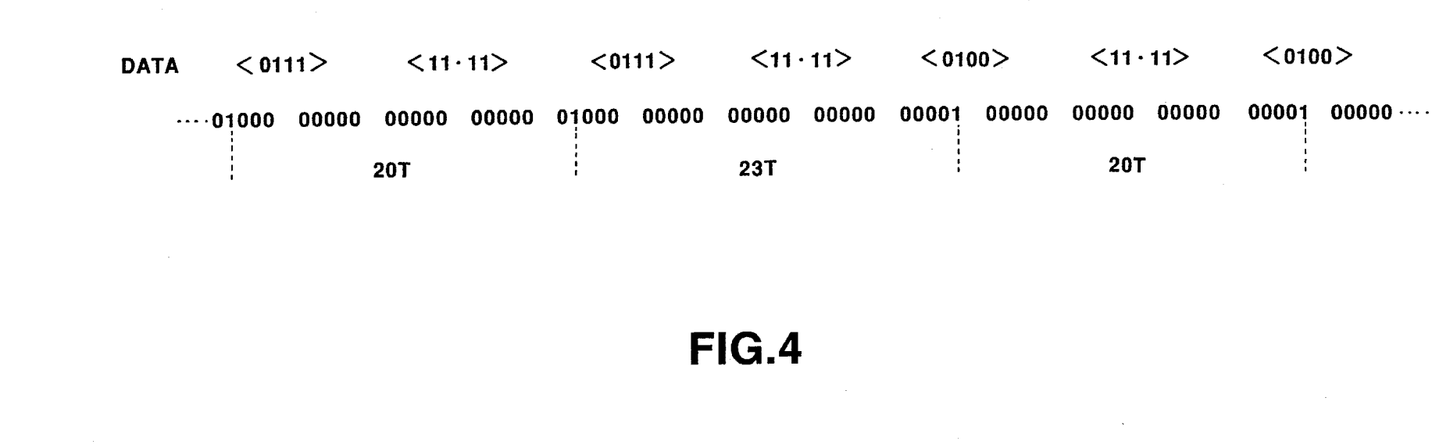
FIG. 4 illustrates an example of synchronization signals according to the present invention.
Figure 5:
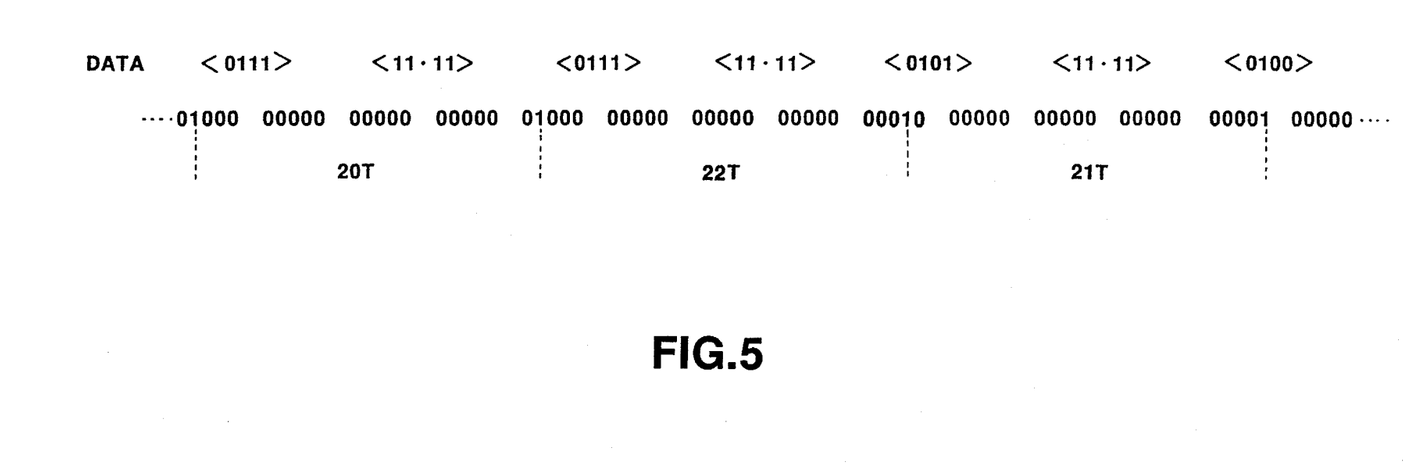
FIG. 5 illustrates another example of synchronization signals according to the present invention.

With the present embodiment, possible examples of long run lengths (lengths of contiguous "0" bits) appearing in data, with the modulation by above-mentioned (d, k; m, n; r) code as the frame synchronization pattern, are those shown in FIGS. 4 and 5.

The examples of FIG. 4 and FIG. 5 of long run lengths with the modulation by the (4, 22; 2, 5: 5) are the stream of channel bits of . . . "0100000000000000000000010000000000000000000000010­000000 000000000000100000" . . . for the data strings of . . . "0111", "11", "11", "0111", "11", "11", "0100", "11", "11", "0100", . . . , as shown in FIG. 4, and the channel bits of . . . "0100000000000000000000010000000000000000000 0001000000" . . . for the data strings of . . . "0111", "11", "11", "0111", "11", "11", "0101", "11", "11", "0100", . . . , as shown in FIG. 5.

It is seen from FIG. 4 that, should there appear 23 T, that is 22 contiguous "0" channel bits, the run lengths before and after it are both 20 T, which represents the maximum value, 19, of contiguous "0" channel bits that can appear before or after a 23 T. It is also seen from FIG. 5 that, should there appear 22 T, that is 21 contiguous "0" channel bits, the run lengths before and after it cannot exceed 21 T, which represents up to a maximum value of 20 contiguous "0" channel bits.

It is seen from this that, among contiguous pattern strings each having a run length not exceeding 23 T, where T denotes the distance between bits (channel clocks), that is a run length not exceeding the maximum distance between transitions of magnetization Tmax=23 T, there are certain combinations of contiguous pattern strings which do not appear in the modulation by the above-mentioned (4, 22; 2, 5; 5) code.

Concrete examples of these combinations include a first combination of 22 T and 22 T (22 T—22 T), a second combination of 23 T and 21 T or 21 T and 23 T (23 T- 21 T or 21 T-23 T), a third combination of 23 T and 22 T or 22 T and 23 T (23 T-22 T or 22 T-23 T) and a fourth combination of 23 T and 23 T (23 T—23 T).

If the number of bits is increased, pattern string combinations other than the first to fourth combinations may also be contemplated, such as 22 T- 21 T—21 T combination. However, this leads to increased redundancy. For this reason, the data string combinations with the least possible number of bits are employed in the present embodiment.

It is mandatory that patterns which never appear in data be used as the frame synchronization signals (synchronization signals). With the present embodiment, this is taken into account when selecting the patterns of the frame synchronization signals among the above-mentioned first combination through fourth combination.

The frame synchronization patterns employed in the present embodiment are characterized in that the patterns can be formed by a run length ("0" continuation) which is less than the maximum distance between transitions of magnetization Tmax (first combination of 22 T—22 T), in that they can be formed by a combination of different run lengths inclusive of a run length equal to the maximum distance between transitions of magnetization Tmax (the second combination of 23 T and 21 T or 21 T and 23 T or the third combination of 23 T and 22 T or 22 T and 23 T) and in that they can be formed by a combination of two contiguous maximum distances between transitions of magnetization Tmax (fourth combination of 23 T and 23 T).

Since the present embodiment has no margin bit, such as that provided in the aforementioned CD format, the maximum distance between transitions of magnetization Tmax= 23 T and the minimum distance between transitions of magnetization Tmin=5 T need to be satisfied solely by synchronization signals. Also, since the (4, 22; 2, 5: 5) code is a variable length type recording code based on the 2/5 modulation, it is desirable from hardware configuration considerations that the length in bits be equal to multiples of 5.

From the foregoing consideration, the following two synchronization signals have been selected for the present embodiment.

That is, the combination of 23 T, 21 T and 6 T is used as the synchronization signal A, while the combination of 21 T, 23 T and 6 T is used as the synchronization signal B. The 6 T of the synchronization signals A and B are due to the bits appended for tail adjustment that provides a bit length equal to multiples of 5.

As described above, with the recording format of the present embodiment, the frame length is longer than that with the above-mentioned CD recording format. For this reason, the parity data for error correction code is increased in volume and in need of 32 bytes in terms of data bits.

Consequently, if, with the recording format of the present embodiment, failure in synchronization is incurred due to readout errors, data demodulation cannot be achieved until detection of the next synchronization signals. With a larger frame length, the volume of lost data is also increased. For this reason, a frame is desirably of a shorter length.

In this consideration, the synchronization signals A and B are employed in the present embodiment in such a manner that the unit of parity appended for error correction coding (data and sector mark 16×10 bytes plus 32 parity bytes) may be in the form of 2 frames (with each frame being 16×5 bytes+16 bytes). That is, the synchronization signal A is used for frame synchronization and synchronization of ECC parity data, while the synchronization signal B is used exclusively for frame synchronization.

By using plural synchronization signals, it becomes possible for the respective synchronization signals to take charge of different functions. In this manner, the frame synchronization signal may be set so as to be arbitrarily shorter than the length of a block to which error correction code data is appended, as a result of which the error correction code data construction may be increased in the number of the degrees of freedom without being limited by the frame length.

The synchronization signal detector of the present embodiment is a synchronization signal detector capable of detecting the above-mentioned synchronization signals A and B.

Returning to FIG. 1, showing the synchronization signal detector of the present embodiment, binary-valued signals, which are RF signals, produced by an optical pickup or a magnetic head reading signal recording regions or pits recorded on a recording medium, such as an optical disc, magnetic disc or a magneto-optical disc, in accordance with the above-depicted recording format of the present embodiment, and clipped at a constant level as a threshold level, are transmitted to an input terminal 1.

Figure 6:
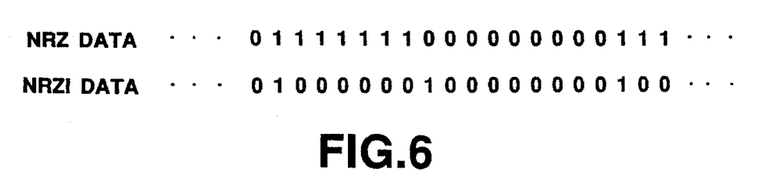
FIG. 6 illustrates conversion of NRZ data into NRZI data.

These binary-valued RF signals are supplied to the NRZI circuit 2 which is operated based on channel clocks from terminal 4 for producing a pulse train based on extracted edge portions of the binary-valued signals. If the binary-valued RF signals are taken as so-called non-return-to-zero (NRZ) signals, having their state inverted at the boundary of the bit information, a pulse train formed by extracted edge portions may be produced by the NRZI circuit 2 inverting the signal state only when the bit information has a value of "1" as shown in FIG. 6

Figure 7:
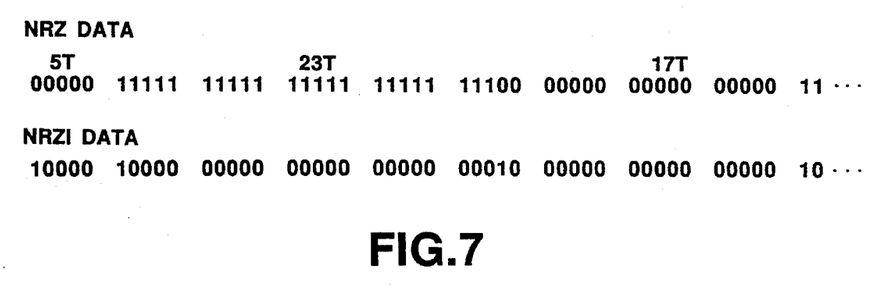
FIG. 7 illustrates conversion of the synchronization signals into NRZI data.
Figure 8:
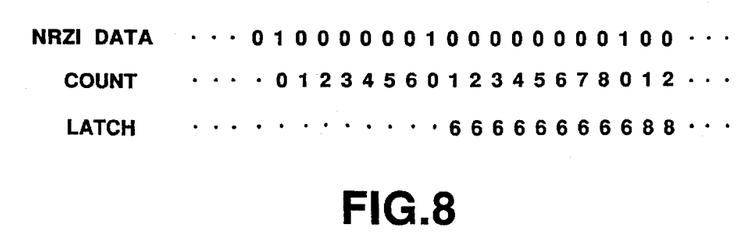
FIG. 8 illustrates the operation of a counter and a latch circuit of the synchronization signal detector according to the present invention.
Figure 9:
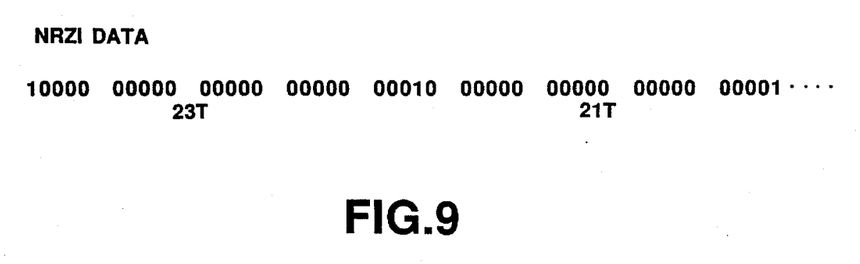
FIG. 9 illustrates a synchronization pattern in NRZI representation according to the present invention.

In other words, if the data supplied to the input terminal 1 is the NRZ data, where "1" and "0" stands for "H" and "L", respectively the data is converted into NRZI data by the NRZI circuit 2, where "1" means inversion and "0" means non-inversion. For example, if the NRZ data is a data string consisting of 5 T, 23 T and 17 T, as shown in FIG. 7, the NRZ data is converted into NRZI data in such a manner that data "1" is present at the point of transition from "0" to "1" or from "1" to "0". In the example of FIG. 7, by conversion of the NRZ data into NRZI data, four "0"s are arrayed during 5 T, 22 "0"s are arrayed during 23 T and 16 "0"s are arrayed during 17 T. Consequently, the aforementioned synchronization signal pattern has 22 "0"s followed by one "1" followed in turn by 20 "0"s, as shown in FIG. 9, or alternatively, 20 "0"s followed by one "1" followed in turn by 22 "0"s.

The pulse train from the NRZI circuit 2 is supplied to a clear terminal of the counter 6 and to a load terminal of a latch circuit 5. The channel clocks from terminal 4 are supplied to clock terminals of the counter 6 and the latch circuit 5.

The counter 6 has a count capacity of counting the number of the longest channel clocks of the transition patterns of the synchronization signals to be detected, and counts the number of the channel clocks T between the edges, that is the number of channel clocks between the edges (transition distances) extracted by the NRZI circuit 2.

The latch circuit 5 holds the count value of the counter 6 (number of channel clocks) and transmits the value of the channel clocks (count value) held thereby to the next stage each time transition of the binary-valued RF signals is incurred, that is each time an edge extracted by the NRZI circuit 2 is encountered. In other words, the latch circuit 5 holds the value of the number of channel clocks (count value) corresponding to the distance between transitions directly preceding the distance between transitions being counted by the counter 6 and transmits the thus held count value to the next stage.

That is, since "1" stands for a point of run interruption, counter 6 counts up by +1 each time "0" data is encountered, while latch circuit 5 holds the count value from the counter 6. Conversely, if the data is "1", counter 6 is cleared, while the latch circuit 5 loads the count value from counter 5, that is the current count value.

The counter 6 and the latch circuit 5 are arranged in a 5-bit output configuration. That is, the output terminals of the counter 6 and the latch circuit 5 are connected to respective input terminals of AND gates 7 to 10.

Specifically, the output terminals of the counter 6 associated with first, second and fourth of the 0th to fourth bits of the five-bit output of the counter 6 are connected to the three input terminals of the AND gate 10, while the output terminals of the counter associated with the second and fourth bits are connected to the two input terminals of the AND gate 9. Also, the output terminals of the latch circuit 5 associated with first, second and fourth of the 0th to fourth bits of the five-bit output of the latch circuit 5 are connected to three input terminals of the AND gate 7, while the output terminals of the latch circuit 5 associated with the second and fourth bits are connected to the two input terminals of the AND gate 8.

The outputs of the AND gates 8 and 10 are supplied to two input terminals of a three-input AND gate 11, while the outputs of the AND gates 7 and 9 are supplied to two input terminals of a three-input AND gate 12. Outputs of the NRZI circuit 2 are supplied to the remaining input terminals of the AND gates 11 and 12. The NRZI data from the NRZI circuit 2 are used as timing signals in the AND gates 11 and 12.

With the present embodiment, the AND gates 7 to 10 detect 21 T or 23 T. On the other hand, the AND gates 11, 12 detect the synchronization signal when the combination of 21 T and 23 T or the combination of 23 T and 21 T is encountered and "1" is entered from NRZI circuit 2.

Outputs of the AND gates 11, 12 are transmitted to associated input terminals of the two-input OR gate 13. An ORed output of the OR gate 13 is output at output terminal 14 as a synchronization signal detection output of the present detector.

Specifically, the synchronization pattern consisting of the combination of 23 T and 21 T in the NRZI representation is detected as shown in FIG. 9.

Figure 10:
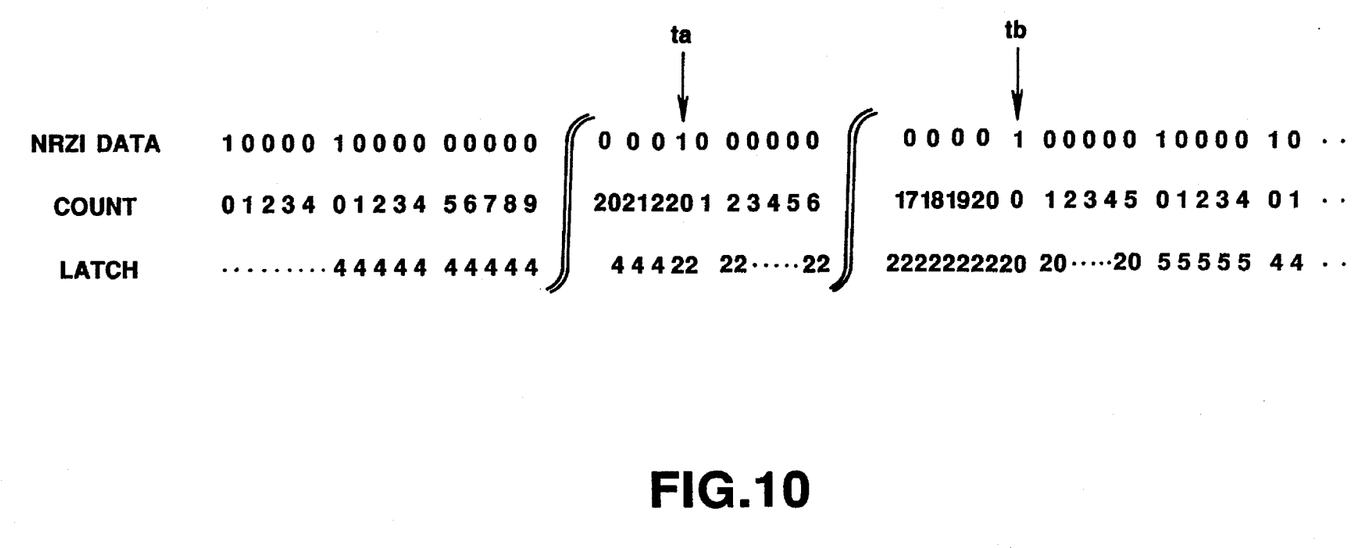
FIG. 10 illustrates a more concrete operation of the counter and the latch circuit at the time of detection of synchronization signals.

Referring to FIG. 10, the NRZI data becomes "1" at a timing ta so that counter 6 is cleared to "0". The latch circuit 5 holds the directly previous count value by fetching the previous count value "22". At a timing tb, the synchronization signal is detected. That is, the count value becomes 20, while the latch circuit 5 holds the count value of "22" at a timing directly preceding timing tb. This count value, thus held by latch circuit 5, becomes the synchronization signal. If "1" appears in data at the timing tb, the synchronization signal is detected by the AND gates 7 to 12 and the OR gate 13.

It is seen from above that a 1-clock synchronization signal detection output is issued when the above data corresponding to the synchronization signal is entered. For example, when the synchronization pattern is a 23 T-21 T combination, data is NRZI representation including 22 contiguous "0"s and 20 contiguous "0"s is detected. Similarly, when the synchronization pattern is a 21 T-23 T combination, data in NRZI representation including 20 contiguous "0"s and 22 contiguous "0"s is detected.

The demodulating device of the present embodiment is now explained.

Figure 11:
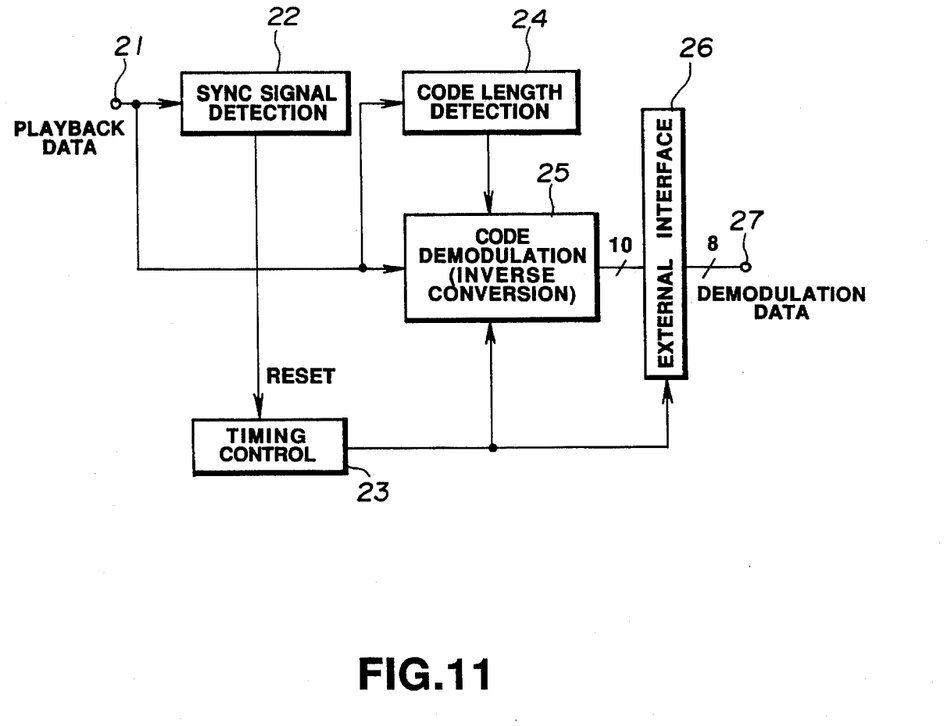
FIG. 11 is a schematic block circuit diagram showing a decoder according to the present invention.

The demodulating device is a decoding device for decoding the above-mentioned variable length coded data and includes, as shown in FIG. 11, a synchronization signal detection circuit 22, arranged as shown in FIG. 1, a timing supervising circuit 23 for detecting the boundary between the blocks of the variable length coded data, based on the synchronization signals detected by the synchronization signal detector 22, and a code length detection circuit 24 for detecting the code length of the variable length coded data. The demodulating device also includes a data demodulating circuit 25 for demodulating the N-bit based variable length coded data into M-bit based original data in accordance with a demodulating table as a counterpart of the modulating table employed for variable length encoding based on the code length data detected by the code length detection circuit 24 and output data of the timing supervising circuit 23. Finally, the demodulating device includes an external interface 26 to which the original data demodulated by the data demodulating circuit 25 and an output of the timing supervising circuit 23 are entered and which effectuates matching between the original data and the downstream side circuit.

Referring to FIG. 11, data read out from a recording medium, such as an optical disc, are supplied to an input terminal 21. The above-mentioned synchronization signals are detected by the synchronization signal detector 22 from data supplied thereto. Based on the synchronization signals, detected by detector 22, the timing control circuit 23 generates timing signals employed for timing control during data demodulation.

Since it is necessary with the variable length coding to detect code length for data demodulation, the code length is detected by the code length detection circuit 24.

Using the code length data from the code length detection circuit 24 and the timing signals from the timing control circuit 23, the data demodulating circuit 25 demodulates data supplied to input terminal 21. Demodulated data from data demodulating circuit 25 are transmitted to the external interface 26 which effectuates matching with the downstream side circuit based on the timing signals. By way of an example, the external circuit 26 translates the 10-bit data from the data demodulating circuit 25 into 8-bit data to output the resulting data. An output of the external interface 26 is output at output terminal 27 as demodulated data.

It is noted that the variable length codes of the present embodiment are employed in a format employed for recording moving picture data on e.g. a compact disc (CD).

Although the present invention has been shown and described with respect to preferred embodiments, various changes and modifications which are obvious to a person skilled in the art to which the invention pertains are deemed to lie within the spirit and scope of the invention as claimed.

What is claimed is:

1. A synchronization signal detector for detecting synchronization signals embedded in radio frequency (RF) signals containing data encoded according to a modulation table, the synchronization signal detector comprising:

means for extracting edges of the RF signals detected as binary-valued signals, counting means for counting a number of channel clocks generated by an external channel clock generator between adjacent extracted edges, holding means for holding a count of the channel clocks previously counted by the counting means while the counting means counts a current number of channel clocks generated between adjacent extracted edges, and means for receiving outputs of the counting means and the holding means and for detecting synchronization signals by comparing the outputs of the counting means and the holding means with synchronization signals comprising two patterns, one pattern representing a frame synchronization signal and the other pattern representing a synchronization signal for at least error correction data.

2. The synchronization signal detector according to claim 1 wherein each of the two patterns comprises a combination of run lengths not present in the encoded data, the run lengths being represented by clocks counted between extracted edges in the synchronization signals, each run length being less than or equal to Tmax, which is the maximum number of clocks between extracted edges in the coded data, and greater than or equal to Tmin, which is the minimum number of clocks between extracted edges in the coded data, inclusive, the patterns also satisfying at least one of the following conditions (i) to (iii):

(i) the patterns are each a combination of run lengths smaller than a maximum number of clocks between transitions of magnetization of the conversion code;

(ii) the patterns are each a combination of different run lengths inclusive of Tmax; and (iii) one of the patterns is a combination of a run length of Tmax and another run length of Tmax contiguous thereto.

3. The synchronization signal detector as claimed in claim 1 wherein a modulation code used for encoding the encoded data is a variable length code having different code word lengths depending on input data word lengths, the variable length code being in the format of (d, k; m, n; r), where d, k means a constraint imposed on a train of the same bits (d means a minimum length of a train of "0" bits, k means a maximum length of the train of "0" bits), m means a basic data length, n means a basic code length, and r means a basic data length of conversion (constraint length), T means a channel clock, and d, k, m, n, r, Tmax and Tmin have the following values:

d=4;

k=22;

m=2;

n=5;

r=5;

Tmax=23 T and

Tmin=5 T.

4. The synchronization signal detector as claimed in claim 3 wherein a spacing between transitions in either of the two patterns comprises one of the following: 22 bits followed by 22 bits, 23 bits followed by 21 bits, 21 bits followed by 23 bits, 23 bits followed by 22 bits, 22 bits followed by 23 bits, and 23 bits followed by 23 bits.

5. The synchronization signal detector as claimed in claim 1 wherein bits for tail adjustment are appended to each pattern.

6. The synchronization signal detector as claimed in claim 5 wherein a total number of bits of the pattern of each of the synchronization signals, including the appended bits, is equal to a multiple of five.

7. A demodulating device for demodulating variable length code data comprising:

a synchronization signal detector comprising means for extracting edges of radio frequency (RF) signals detected as binary-valued signals;

counting means for counting a number of channel clocks generated by an external source between adjacent extracted edges;

holding means for holding a count of the channel clocks previously counted by the counting means while the counting means counts a current number of channel clocks between adjacent extracted edges;

detecting means for receiving outputs of the counting means and the holding means and detecting synchronization signals by comparing the outputs of the counting means and the holding means with synchronization signals comprising two patterns, one pattern representing a frame synchronization signal and the other pattern representing a synchronization signal for at least error correction data;

timing controlling means for detecting a block boundary of variable length code data based on synchronization signals detected by the detecting means and for outputting timing control information;

code length detection means for detecting a code length of the variable length data;

data demodulating means supplied with the detected code length of the variable length data for demodulating the variable length code data into original data in accordance with a demodulation table used to decode the variable length encoded data, based on a detected code length data outputted by the code length detection means and timing control information output by the timing controlling means; and matching means for receiving as inputs demodulated original data output by the data demodulating means and the timing control information output by the timing controlling means and using the inputs for matching the original data to an external circuit.

8. A method for detecting synchronization signals embedded in radio frequency (RF) signals containing data encoded according to a modulation table, the synchronization signal detecting method comprising the steps of:

extracting edges of the RF signals detected as binary-valued signals, counting a number of channel clocks generated by an external channel clock generator between adjacent extracted edges, holding a count of the channel clocks previously counted while counting a current number of channel clocks generated between adjacent extracted edges, and receiving current counts and held counts and detecting which of two synchronization signals are present by comparing the current counts and the held counts with synchronization signals comprising two patterns, one pattern representing a frame synchronization signal and the other pattern representing a synchronization signal for at least error correction data.

9. The synchronization signal detecting method according to claim 8 wherein each of the two patterns comprises a combination of run lengths not present in the encoded data, the run lengths being represented by clocks counted between extracted edges in the synchronization signals, each run length being less than or equal to Tmax, which is the maximum number of clocks between extracted edges in the coded data, and greater than or equal to Tmin, which is the minimum number of clocks between extracted edges in the coded data, inclusive, the patterns also satisfying at least one of the following conditions (i) to (iii):

(i) the patterns are each a combination of run lengths smaller than a maximum number of clocks between transitions of magnetization of the conversion code;

(ii) the patterns are each a combination of different run lengths inclusive of Tmax; and (iii) one of the patterns is a combination of a run length of Tmax and another run length of Tmax contiguous thereto.

10. The synchronization signal detecting method as claimed in claim 8 wherein a modulation code used for encoding the encoded data is a variable length code having different code word lengths depending on input data word lengths, the variable length code being in the format of (d, k; m, n; r), where d, k means a constraint imposed on a train of the same bits (d means a minimum length of a train of "0" bits, k means a maximum length of the train of "0" bits), m means a basic data length, n means a basic code length, T means a channel clock, and r means a basic data length of conversion (constraint length), and d, k, m, n, r, Tmax and Tmin have the following values:

d=4;

k=22;

m=2;

n=5;

r=5;

Tmax=23 T and

Tmin=5 T.

11. The synchronization signal detecting method as claimed in claim 10 wherein a spacing between transitions in either of the two patterns comprises one of the following: 22 bits followed by 22 bits, 23 bits followed by 21 bits, 21 bits followed by 23 bits, 23 bits followed by 22 bits, 22 bits followed by 23 bits, and 23 bits followed by 23 bits.

12. The synchronization signal detecting method as claimed in claim 8 wherein bits for tail adjustment are appended to each pattern.

13. The synchronization signal detecting method as claimed in claim 12 wherein a total number of bits of the pattern of each of the synchronization signals, including the appended bits, is equal to a multiple of five.

14. A synchronization signal detector for detecting synchronization signals embedded in radio frequency (RF) signals containing data encoded according to a modulation table, the synchronization signal detector comprising:

means for extracting edges of the RF signals detected as binary-valued signals, counting means for counting a number of channel clocks generated by an external channel clock generator between adjacent extracted edges, holding means for holding a count of the channel clocks previously counted by the counting means while the counting means counts a current number of channel clocks generated between adjacent extracted edges, means for receiving outputs of the counting means and the holding means and for detecting synchronization signals by comparing the outputs of the counting means and the holding means with synchronization signals comprising two patterns, one pattern representing a frame synchronization signal and the other pattern representing a synchronization signal for at least error correction data, wherein the spacing between transitions in either of the two patterns comprises one of the following: 22 bits followed by 22 bits, 23 bits followed by 21 bits, 21 bits followed by 23 bits, 23 bits followed by 22 bits, 22 bits followed by 23 bits, 23 bits followed by 23 bits, and wherein bits for tail adjustment are appended to each pattern.

* * * * *